United States Patent
Hung et al.

(10) Patent No.: US 9,455,637 B2
(45) Date of Patent: Sep. 27, 2016

(54) METHOD FOR EXTENDING POWER SUPPLY HOLD-UP TIME BY CONTROLLING A TRANSFORMER TURN RATIO

(71) Applicant: Dell Products, L.P., Round Rock, TX (US)

(72) Inventors: Tsai-Fu Hung, Hsin-Dian (TW); Hung-Hsun Tsai, Taipei (TW); Yu-Hung Lai, New Taipei (TW); Kuang-Hao Chou, ChunHo (TW)

(73) Assignee: DELL PRODUCTS L.P., Round Rock, TX (US)

( * ) Notice: Subject to any disclaimer, the term of this patent is extended or adjusted under 35 U.S.C. 154(b) by 129 days.

(21) Appl. No.: 14/588,228

(22) Filed: Dec. 31, 2014

(65) Prior Publication Data
US 2016/0190934 A1    Jun. 30, 2016

(51) Int. Cl.
  *H02M 5/10*  (2006.01)
  *H02M 3/335* (2006.01)
(52) U.S. Cl.
  CPC ................. *H02M 3/33507* (2013.01)
(58) Field of Classification Search
  CPC .................. H02M 5/10; H02M 5/12
  USPC .................................... 323/301, 359
  See application file for complete search history.

(56) References Cited

U.S. PATENT DOCUMENTS

2010/0116595 A1*  5/2010  Kang ............... B66B 1/06
                                                                 187/289

* cited by examiner

*Primary Examiner* — Jeffrey Sterrett
(74) *Attorney, Agent, or Firm* — Norton Rose Fulbright US LLP

(57) ABSTRACT

In one embodiment a method of extending power supply hold-up time by controlling a transformer turn ratio may include an input capacitor receiving an input voltage of a transformer unit. A first control transistor may switch a first transformer winding to an on state in response to the input voltage being above a voltage threshold level. The first control transistor may switch the first transformer winding to an off state in response to the input voltage being below the voltage threshold level. A second control transistor may switch a second transformer winding to an on state in response to the input voltage being below the voltage threshold level, wherein the first transformer winding and the second transformer winding may include separate windings located on a same side of a magnetic core of the transformer unit. In an embodiment the transformer unit may include a power supply unit.

20 Claims, 10 Drawing Sheets

METHOD FOR EXTENDING POWER SUPPLY HOLD-UP TIME BY CONTROLLING A TRANSFORMER TURN RATIO

FIELD

This disclosure relates generally to computer systems, and more specifically, to a method for extending power supply hold-up time by controlling a transformer turn ratio.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include multiple or redundant power supply units as a failsafe for power system malfunction. Power supply units may perform a variety of functions, such as, but not limited to, power conversion, alternating current to direct current (AC-DC) or DC-DC conversion, adjusting voltage levels, and/or providing backup power during power grid outages. When the AC input voltage is removed from an AC-DC power supply unit the DC output voltage will begin to decline. An information handling system connected to the power supply unit will no longer be able to draw power from the power supply unit once the output voltage falls below a useful level. Consequently, the information handling system might lose data if the data is not backed up before power is lost. Power supply units may be designed to extend the "hold-up time", which is defined as the time that the power supply unit provides useful power after the AC input voltage is disconnected. However, conventional methods of extending hold-up time typically require the addition of large capacitors that increase the physical size of the power supply unit.

SUMMARY

In one embodiment a method of extending power supply hold-up time by controlling a transformer turn ratio may include an input capacitor receiving an input voltage of a transformer unit. A first control transistor may switch a first transformer winding to an on state in response to the input voltage being above a voltage threshold level. The first control transistor may switch the first transformer winding to an off state in response to the input voltage being below the voltage threshold level. A second control transistor may switch a second transformer winding to an on state in response to the input voltage being below the voltage threshold level, wherein the first transformer winding and the second transformer winding may include separate windings located on a same side of a magnetic core of the transformer unit.

In an embodiment the same side of the magnetic core may include an input side of the transformer unit. In another embodiment the same side of the magnetic core may include an output side of the transformer unit. In one embodiment the first transformer winding may include thirteen (13) turns, and the second transformer winding may include ten (10) turns. In an embodiment the voltage threshold level may include three hundred and thirty (330) Volts. In one embodiment the first transformer winding may further include multiple separate windings, and the second transformer winding may further include multiple separate windings. In an embodiment the transformer unit may include a power supply unit.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
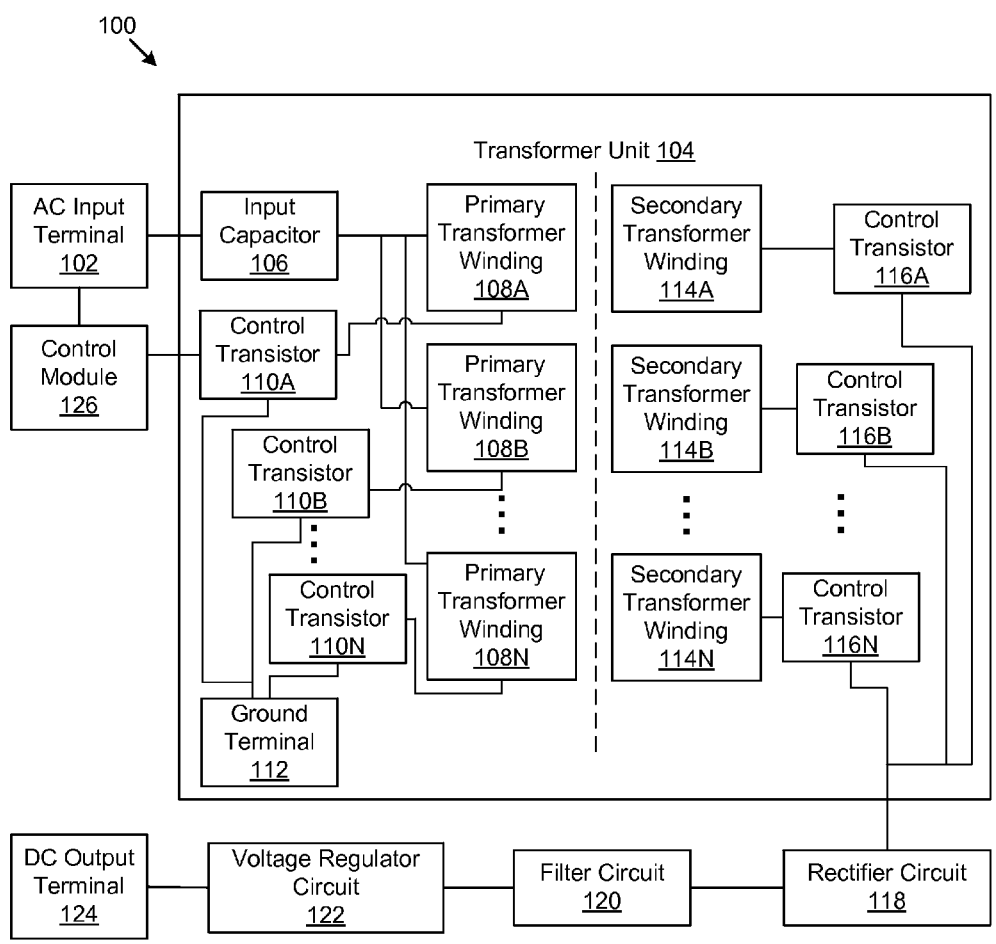
FIG. 1 is a schematic block diagram illustrating one embodiment of a system for extending power supply hold-up time by controlling a transformer turn ratio.

Embodiments of methods and systems for extending power supply hold-up time by controlling a transformer turn ratio are described. In an embodiment, the power supply unit may include a transformer unit having multiple separate windings with distinct coil properties, where the on/off status of each separate winding is dynamically controlled by transistor-based control circuits to maximize power supply unit output voltage hold-up time in the event that the alternating current (AC) input is disconnected or switched off.

In various configurations, the power supply unit may include a transformer with one or more windings on the input side and one or more windings on the output side. The multiple windings are separate and may each have a different turn ratio or number of coils. The control circuitry is configured to adjust the output voltage characteristics of the transformer unit by activating or deactivating different transformer windings based on changes in the AC input over time, thereby extending the hold-up time of the power supply unit.

In a typical transformer the output voltage is defined as Vout=(Vin/N)×D, where Vout is the output voltage, Vin is the input voltage, N is the transformer turn ratio, and D is the controller duty cycle. The transformer turn ratio N may thus be dynamically adjusted by selectively activating transformer windings that have different number of coils in order to change the output voltage Vout as the input voltage Vin falls over time if the AC input voltage is disconnected. For example, if N=13 and Vin is between 400V to 330V, then D will be between 47% and 40%. Similarly, if N=10 and Vin has fallen to be between 330V to 270V, then D will be between 44.5% and 36%. In this example, once the input voltage falls below 330V, as detected as 330V direct current (DC) signal at the bulk input capacitor of the power supply unit, the downstream DC/DC stage may switch off a first transformer coil that resulted in a turn ratio of N=13 and adjust the power supply output characteristics by switching on a second transformer coil that results in a turn ratio of N=10, thereby extending the hold-up time of the power supply unit.

Power supply unit density is an important factor in modern information handling systems where it is desirable to limit the physical footprint of each component of the system while also maximizing system performance. The present invention increases power density by enabling the transformer turn ratio (and thus output voltage characteristics) to be adjusted dynamically without the need for additional bulky capacitors. The transistor-based switching also increases the efficiency and flexibility of the power supply unit design. Multiple transistor-based embodiments are possible, including forward converter, flyback converter, full bridge, and half bridge power supply unit designs.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a schematic circuit diagram illustrating one embodiment of a system 100 for extending power supply hold-up time by controlling a transformer turn ratio. In one embodiment system 100 may include an AC input terminal 102, a transformer unit 104, a rectifier circuit 118, a filter circuit 120, a voltage regulator circuit 122, and a DC output terminal 124. In another embodiment on or more of rectifier circuit 118, filter circuit 120, and/or voltage regulator circuit 122 may be internal to transformer unit 104. Transformer unit 104 may include an input capacitor 106, which in some embodiments may also be referred to as a bulk input capacitor. The input capacitor 106 receives an input signal from AC input terminal 102. The input capacitor 106 is also connected to one or more primary transformer windings 108A-N that are located on a first or "input side" of the transformer unit 104. Primary transformer windings 108A-N are in turn connected to one or more control transistors 110A-N respectively, and the one or more control transistors 110A-N are connected to a ground terminal 112. In an embodiment, the control transistors 110A-N may be configured to selectively switch off or on (i.e., deactivate or activate) the corresponding primary transformer windings 108A-N, thereby dynamically altering the turn ratio of transformer unit 104 in response to changes in the input voltage (e.g., with respect to a voltage threshold level).

In one embodiment, a second or "output side" of transformer unit 104 may include one or more secondary transformer windings 114A-N that are configured opposite a magnetic core with respect to the primary transformer windings 108A-N from the input side. The secondary transformer windings 114A-N are connected to one or more control transistors 116A-N respectively. In an embodiment control transistors 116A-N are communicatively connected to an output terminal, such as DC output terminal 124 via rectifier circuit 118 and/or additional circuits (e.g., filter circuit 120 and/or voltage regulator circuit 122). In an embodiment, the control transistors 116A-N may be configured to selectively switch off or on (i.e., deactivate or activate) the corresponding secondary transformer windings 114A-N, thereby dynamically altering the turn ratio of transformer unit 104 in response to changes in the input voltage (e.g., with respect to a voltage threshold level).

In one embodiment transformer unit 104 may be configured such that the input side includes multiple separate distinct primary transformer windings 108A-N while the output side includes a single secondary transformer winding 114A. Similarly, in another embodiment transformer unit 104 may be configured such that the output side includes multiple separate distinct secondary transformer windings 114A-N while the input side includes a single primary transformer winding 108A. In yet another embodiment, transformer unit 104 may be configured such that both the input and output sides include multiple separate distinct transformer windings, such as primary transformer windings 108A-N and secondary transformer windings 114A-N respectively. In an embodiment control transistors 110A-N and control transistors 116A-N may be Metal-Oxide-Semiconductor Field-Effect Transistors (MOSFETs).

In an embodiment system 100 may also include a control module 126 configured for detecting a voltage level of the input voltage via a connection to AC input terminal 102. In various embodiments control module 126 may be connected to one or more of control transistors 110A-N and/or control transistors 116A-N such that control module 126 may utilize the switching functionality of control transistors 110A-N and/or control transistors 116A-N to selectively switch off or on (i.e., deactivate or activate) one or more of primary transformer windings 108A-N and/or secondary transformer windings 114A-N. In various embodiments control module 126 may be a circuit module, a processor, firmware, a software module, or a combination thereof. In another embodiment control module 126 may not be included in system 100, and control transistors 110A-N and/or control transistors 116A-N may sense the input voltage via other connections to input capacitor 106 or AC input terminal 102.

Figure 2:
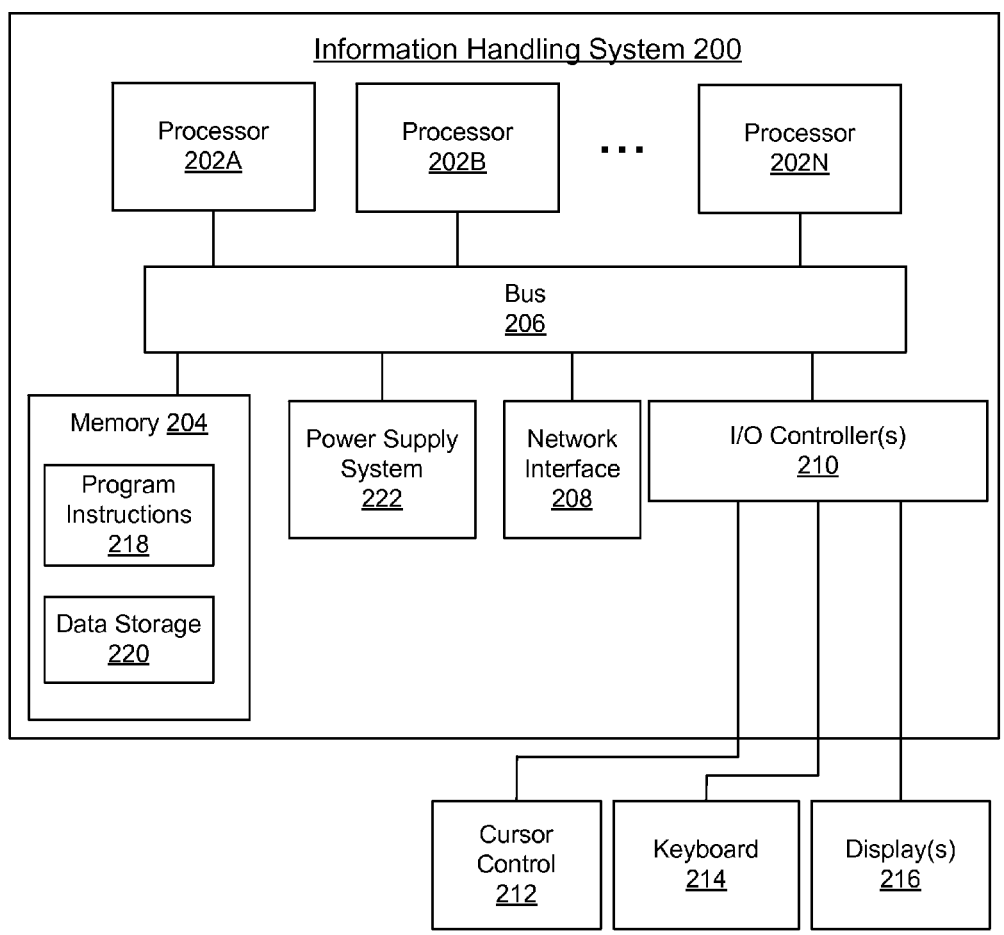
FIG. 2 is a schematic block diagram illustrating one embodiment of an Information Handling System (IHS) configured for extending power supply hold-up time by controlling a transformer turn ratio.

FIG. 2 is a schematic block diagram illustrating one embodiment of an Information Handling System (IHS) 200 configured for extending power supply hold-up time by controlling a transformer turn ratio. In one embodiment, system 100 may be implemented on an information handling system similar to IHS 200 described in FIG. 2. Similarly, control module 126 and/or transformer unit 104 may be implemented on an information handling system similar to IHS 200 described in FIG. 2. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. IHS 200 further includes network interface 208 coupled to bus 206, and input/output (I/O) controller(s) 210, coupled to devices such as cursor control device 212, keyboard 214, and display(s) 216. In some embodiments, a given entity (e.g., system 100) may be implemented using a single instance of IHS 200, while in other embodiments multiple such information handling systems, or multiple nodes making up IHS 200, may be configured to host different portions or instances of embodiments (e.g., transformer unit 104). In one embodiment IHS 200 may include a power supply system 222 coupled to bus 206. Power supply system 222 may perform functions of embodiments illustrated in FIG. 1, FIG. 3, FIG. 4, FIG. 5, FIG. 6, FIG. 7, FIG. 8, FIG. 9, and/or FIG. 10.

In various embodiments, IHS 200 may be a single-processor information handling system including one processor 202A, or a multi-processor information handling system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, in an embodiment memory 204 may be used to store software program and/or database shown in FIG. 3 or in control module 126 of FIG. 1. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media—e.g., disk or CD/DVD-ROM coupled to IHS 200 via bus 206, or non-volatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N.

Network interface 208 may be configured to allow data to be exchanged between IHS 200 and other devices, such as other information handling systems attached to transformer unit 104, for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 3. For example, program instructions 218 may be implemented in various embodiments using any desired programming language, scripting language, or combination of programming languages and/or scripting languages. Data storage 220 may include data that may be used in these embodiments such as, for example, control signals corresponding to control transistors 110A-N and/or control transistors 116A-N. In other embodiments, other or different software elements and data may be included.

A person of ordinary skill in the art will appreciate that IHS 200 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Embodiments of system 100, control module 126, and/or transformer unit 104 described in FIG. 1 may be implemented in an information handling system that is similar to IHS 200. In one embodiment, the elements described in FIG. 1, FIG. 3, FIG. 4, FIG. 5, FIG. 6, FIG. 7, FIG. 8, FIG. 9, and/or FIG. 10 may be implemented in discrete hardware modules. Alternatively, the elements may be implemented in software-defined modules which are executable by one or more of processors 202A-N, for example.

Figure 3:
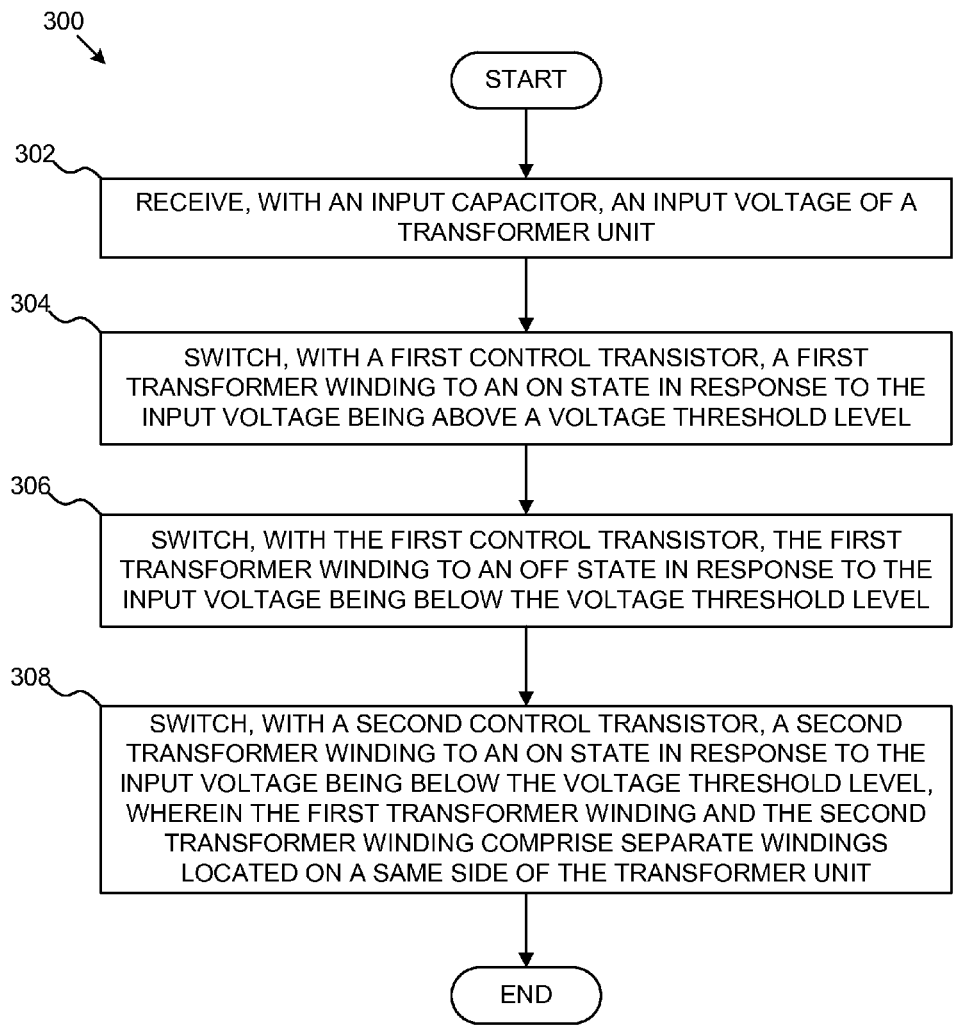
FIG. 3 is a schematic flowchart diagram illustrating one embodiment of a method for extending power supply hold-up time by controlling a transformer turn ratio.

FIG. 3 is a schematic flowchart diagram illustrating one embodiment of a method 300 for extending power supply hold-up time by controlling a transformer turn ratio. At block 302, the method 300 includes receiving, with an input capacitor, an input voltage of a transformer unit. As depicted at block 304, the method 300 includes switching, with a first control transistor, a first transformer winding to an on state in response to the input voltage being above a voltage threshold level. As shown in block 306, the method 300 includes switching, with the first control transistor, the first transformer winding to an off state in response to the input voltage being below the voltage threshold level. As depicted in block 308, the method 300 includes switching, with a second control transistor, a second transformer winding to an on state in response to the input voltage being below the voltage threshold level, wherein the first transformer winding and the second transformer winding may include separate windings located on a same side of the transformer unit.

Figure 4:
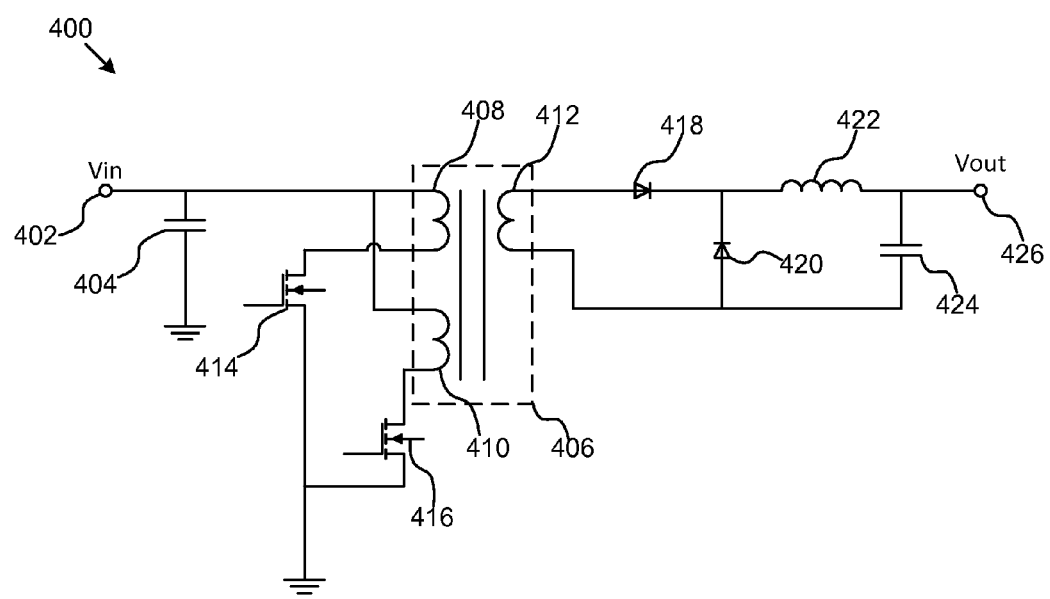
FIG. 4 is a schematic circuit diagram illustrating one embodiment of an apparatus for extending power supply hold-up time by controlling a transformer turn ratio.
Figure 5:
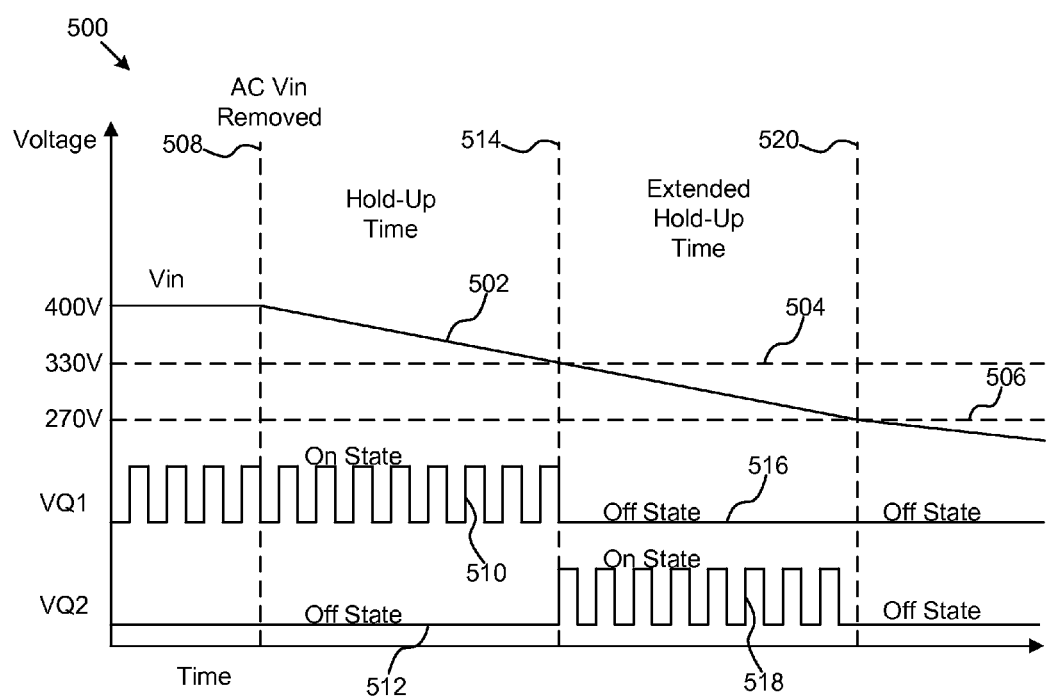
FIG. 5 is a schematic voltage graph illustrating one embodiment of a method for extending power supply hold-up time by controlling a transformer turn ratio.

FIG. 4 is a schematic circuit diagram illustrating one embodiment of an apparatus 400 for extending power supply hold-up time by controlling a transformer turn ratio. In one embodiment the apparatus 400 may be referred to as a primary side forward topology. The voltage output performance characteristics of an embodiment of apparatus 400 are illustrated in FIG. 5. In an embodiment apparatus 400 includes a voltage input terminal 402, an input capacitor 404, and a transformer 406. As depicted transformer 406 includes a first primary transformer winding 408 and a second primary transformer winding 410, which are configured on the input side of transformer 406 opposite a secondary transformer winding 412 on the output side. In one embodiment the first primary transformer winding 408 may have a first number of turns, such as 13 turns, and the second primary transformer winding 410 may have a second number of turns, such as 10 turns. The first primary transformer winding 408 is connected to a first control transistor 414 that controls the state (i.e., on or off) of first primary transformer winding 408. Similarly, the second primary transformer winding 410 is connected to a second control transistor 416 that controls the state (i.e., on or off) of second primary transformer winding 410. As shown apparatus 400 includes diode 418, diode 420, inductor 422, output capacitor 424, and voltage output terminal 426.

FIG. 5 is a schematic voltage graph 500 illustrating one embodiment of a method for extending power supply hold-up time by controlling a transformer turn ratio. As depicted, the voltage graph 500 includes voltage on a y-axis and time on an x-axis. The voltage graph 500 includes an input voltage 502, which may correspond to the input voltage of apparatus 400 of FIG. 4. The voltage graph 500 also includes a voltage threshold level 504 and a low voltage level 506, where the low voltage level 506 corresponds to a minimum useful voltage of an information handling system connected to a power supply unit.

As shown at time 508 an AC input voltage is removed from a power supply unit, such as apparatus 400. After the AC input voltage is removed, the input voltage 502 begins to fall. As depicted at time 514, the input voltage 502 falls to the voltage threshold level 504. In an embodiment the voltage threshold level may be 330 Volts. In one embodiment the time between time 508 and time 514 may be an "initial hold-up time". During the initial hold-up time, a first transformer coil is set to an on state as depicted in on state 510. In response to the input voltage 502 falling below the threshold voltage 504, a control transistor switches the first transformer coil to an off state 516. Also in response to the input voltage 502 falling below the threshold voltage 504, a second control transistor switches a second transformer coil from an off state 512 to an on state 518.

In one embodiment the input voltage 502 may continue to fall until the input voltage 502 reaches the low voltage level 506. The time between the input voltage reaching the voltage threshold level 504 and reaching the low voltage level 506 may be defined as an "extended hold-up time". The apparatus 400 thereby increases the total power supply unit hold-up time by providing both an initial hold-up time and an extended hold-up time as a result of the control transistors switching the input voltage between the first and second transformer coils dynamically. In an embodiment the second control transistor may switch the second transformer coil to an off state once the input voltage 502 reaches the low voltage level 506. In one embodiment the low voltage level may be 270 Volts.

Figure 6:
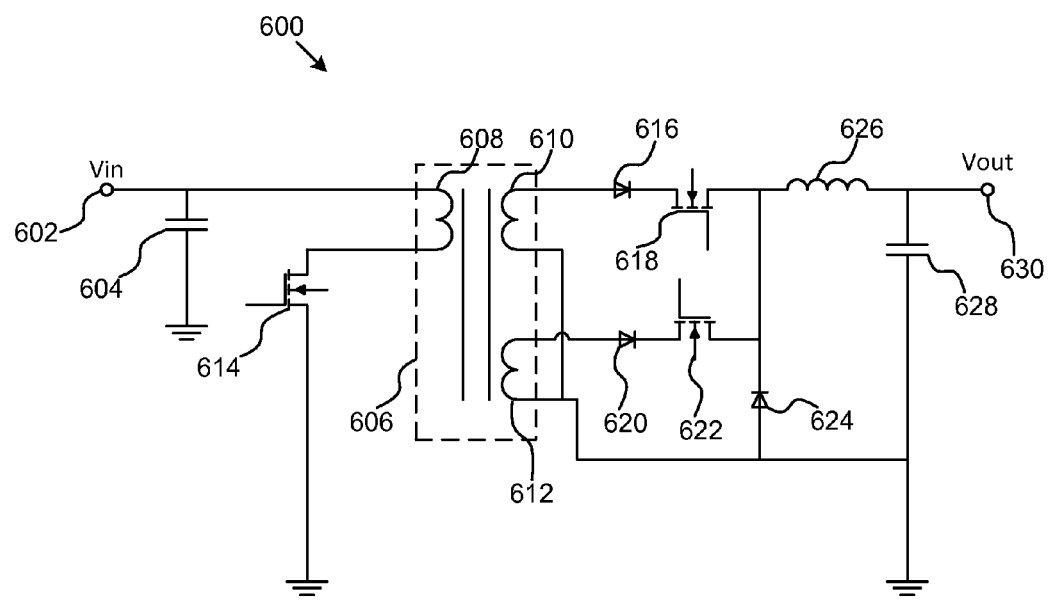
FIG. 6 is a schematic circuit diagram illustrating one embodiment of an apparatus for extending power supply hold-up time by controlling a transformer turn ratio.

FIG. 6 is a schematic circuit diagram illustrating one embodiment of an apparatus 600 for extending power supply hold-up time by controlling a transformer turn ratio. In one embodiment the apparatus 600 may be referred to as a secondary side forward topology. In an embodiment apparatus 600 includes a voltage input terminal 602, an input capacitor 604, and a transformer 606. As depicted transformer 606 includes a primary transformer winding 608 on an input side. Transformer 606 also includes a first secondary transformer winding 610 and a second secondary transformer winding 612, which are both on an output side of transformer 606. The primary transformer winding 608 may be controlled via control transistor 614. The first secondary transformer winding 610 is coupled to diode 616 and may be controlled via control transistor 618. Similarly, the second secondary transformer winding 612 is connected to diode 620 and may be controlled via control transistor 622. In an embodiment the output circuitry of apparatus 600 also includes diode 624, inductor 626, output capacitor 628, and voltage output terminal 630. Apparatus 600 is thus an example of an embodiment utilizing two separate transformer windings on an output side of the transformer to dynamically adjust the transformer turn ratio in response to changes in the input voltage.

Figure 7:
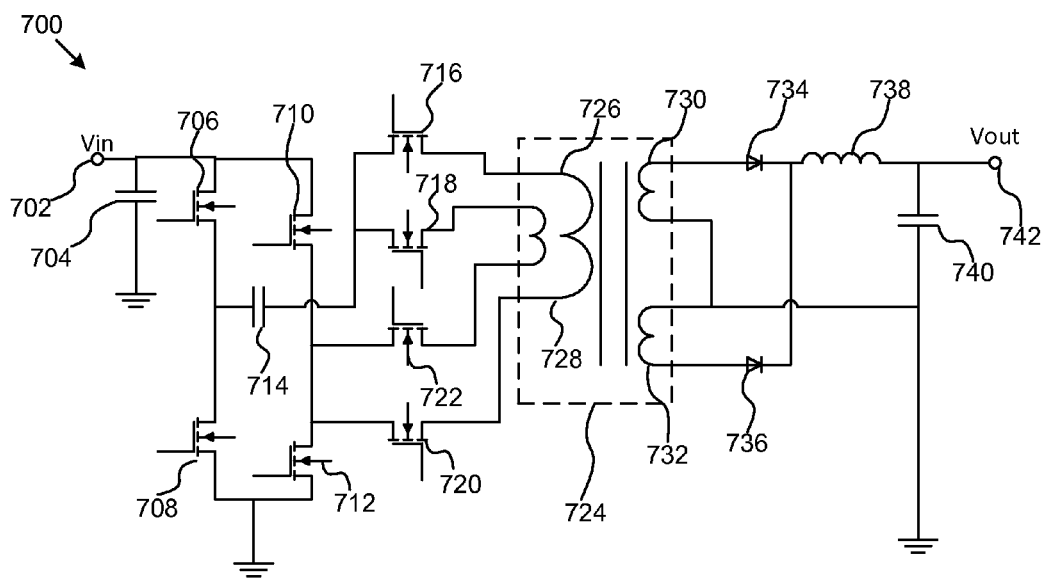
FIG. 7 is a schematic circuit diagram illustrating one embodiment of an apparatus for extending power supply hold-up time by controlling a transformer turn ratio.

FIG. 7 is a schematic circuit diagram illustrating one embodiment of an apparatus 700 for extending power supply hold-up time by controlling a transformer turn ratio. In one embodiment the apparatus 700 may be referred to as a primary side full bridge topology. In an embodiment apparatus 700 includes a voltage input terminal 702, an input capacitor 704, as well as multiple input transistors 706, 708, 710, and 712. Input transistors 706 and 708 are connected to control transistors 716 and 718 via capacitor 714. Input transistor 710 and 712 are connected to control transistors 720 and 722. In one embodiment control transistor 716 and control transistor 720 are connected to a first primary transformer winding 728, which may be switched to an on state when the input voltage is above the voltage threshold. Similarly, control transistor 718 and control transistor 722 are connected to a second primary transformer winding 726, which may be switched to an on state in response to the input voltage falling below the voltage threshold. In one embodiment the first primary transformer winding 728 and the second primary transformer winding 726 may be separate distinct windings configured in a nested configuration along a similar axis of the transformer 724.

As depicted, the apparatus 700 includes a first secondary transformer winding 730 and a second secondary transformer winding 732 on the output side. The first secondary transformer winding 730 is connected to diode 734, and the second secondary transformer winding 732 is connected to diode 736. Diode 734 and diode 736 are in turn connected to inductor 738, which is connected to output capacitor 740 and voltage output terminal 742.

Figure 8:
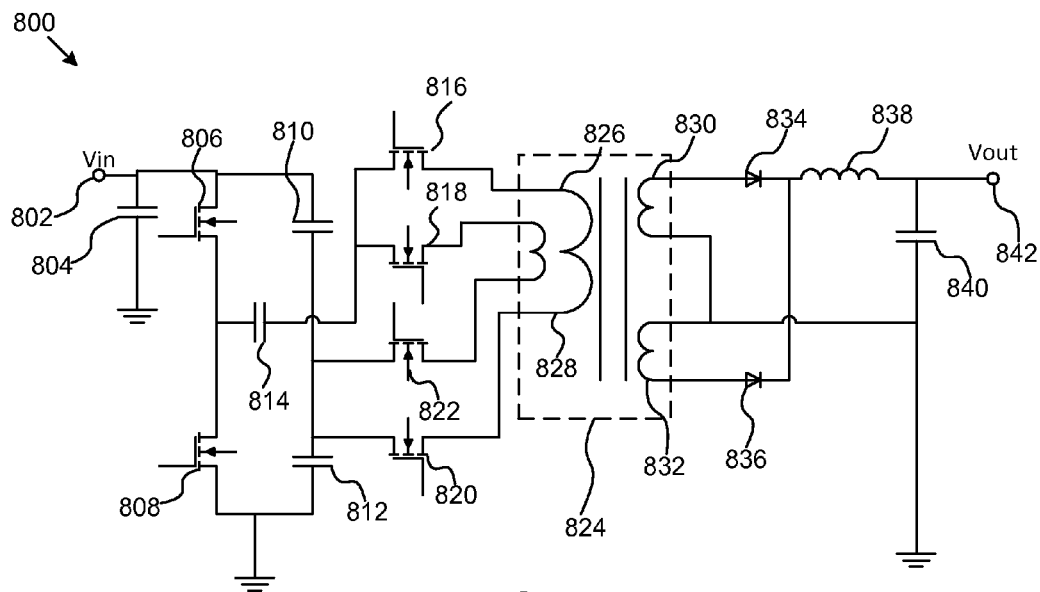
FIG. 8 is a schematic circuit diagram illustrating one embodiment of an apparatus for extending power supply hold-up time by controlling a transformer turn ratio.

FIG. 8 is a schematic circuit diagram illustrating one embodiment of an apparatus 800 for extending power supply hold-up time by controlling a transformer turn ratio. In one embodiment the apparatus 800 may be referred to as a primary side half bridge topology. In an embodiment apparatus 800 includes a voltage input terminal 802, an input capacitor 804, as well as input transistors 806 and 808. Input transistors 806 and 808 are connected to control transistors 816 and 818 via capacitor 814. A first capacitor 810 and a second capacitor 812 are connected to control transistors 820 and 822. In one embodiment control transistor 816 and control transistor 820 are connected to a first primary transformer winding 828, which may be switched to an on state when the input voltage is above the voltage threshold. Similarly, control transistor 818 and control transistor 822 are connected to a second primary transformer winding 826, which may be switched to an on state in response to the input voltage falling below the voltage threshold. In one embodiment the first primary transformer winding 828 and the second primary transformer winding 826 may be separate distinct windings configured in a nested configuration along a similar axis of the transformer 824.

As depicted, the apparatus 800 includes a first secondary transformer winding 830 and a second secondary transformer winding 832 on the output side. The first secondary transformer winding 830 is connected to diode 834, and the second secondary transformer winding 832 is connected to diode 836. Diode 834 and diode 836 are in turn connected to inductor 838, which is connected to output capacitor 840 and voltage output terminal 842.

Figure 9:
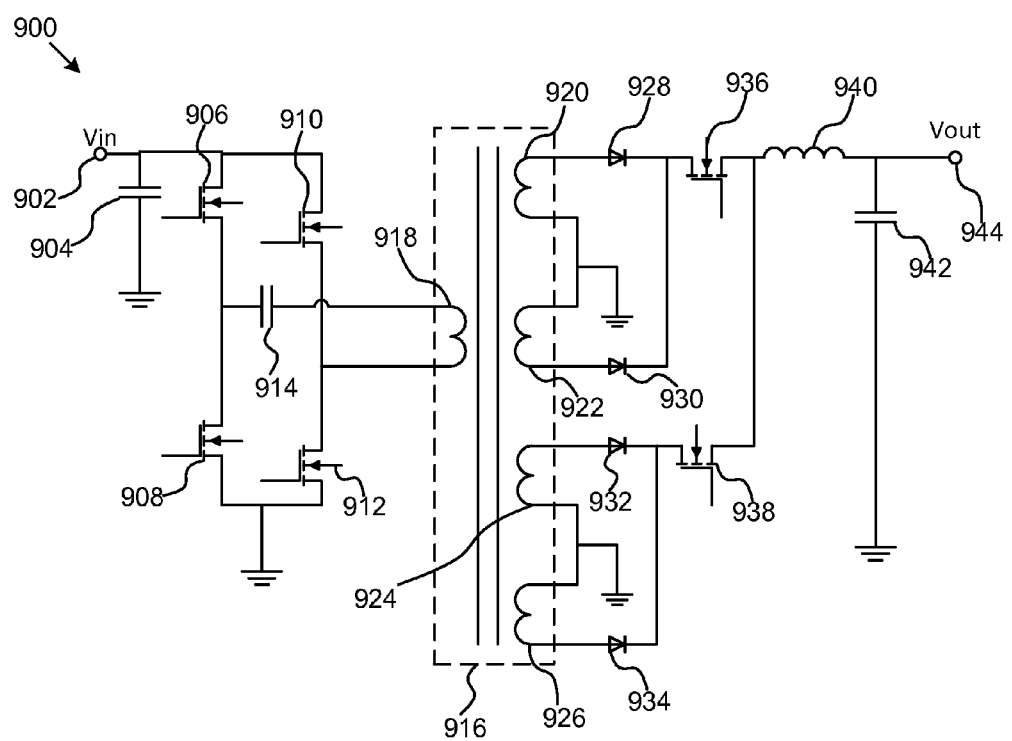
FIG. 9 is a schematic circuit diagram illustrating one embodiment of an apparatus for extending power supply hold-up time by controlling a transformer turn ratio.

FIG. 9 is a schematic circuit diagram illustrating one embodiment of an apparatus 900 for extending power supply hold-up time by controlling a transformer turn ratio. In one embodiment the apparatus 900 may be referred to as a secondary side for full/half bridge topology. In an embodiment apparatus 900 includes a voltage input terminal 902, an input capacitor 904, as well as multiple input transistors 906, 908, 910, and 912. Input transistors 906 and 908 are connected to primary transformer winding 918 via capacitor 914. Input transistors 910 and 912 are connected directly to primary transformer winding 918. In the depicted embodiment the output side of transformer 916 includes a first secondary transformer winding 920, a second secondary transformer winding 922, a third secondary transformer winding 924, and a fourth secondary transformer winding 926. The first secondary transformer winding 920 is connected to diode 928, and the second secondary transformer winding is connected to diode 930. Diodes 928 and 930 are connected to first control transistor 936. In one embodiment the first control transistor 936 may turn on both the first secondary transformer winding 920 and the second secondary transformer winding 922 in response to the input voltage being above the voltage threshold level.

As shown, the third secondary transformer winding 924 is connected to the second control transistor 938 via diode 932, and the fourth secondary transformer winding 926 is connected to the second control transistor 938 via diode 934. In an embodiment the second control transistor 938 may turn on both the third secondary transformer winding 924 and the fourth secondary transformer winding 926 in response to the input voltage being below the voltage threshold level. In one embodiment the output side of apparatus 900 also includes inductor 940, which is connected to output capacitor 942 and voltage output terminal 944. Apparatus 900 is thus an example of an embodiment utilizing multiple separate subwindings that may be selectively controlled in various combinations to dynamically adjust the turn ratio of transformer 916.

Figure 10:
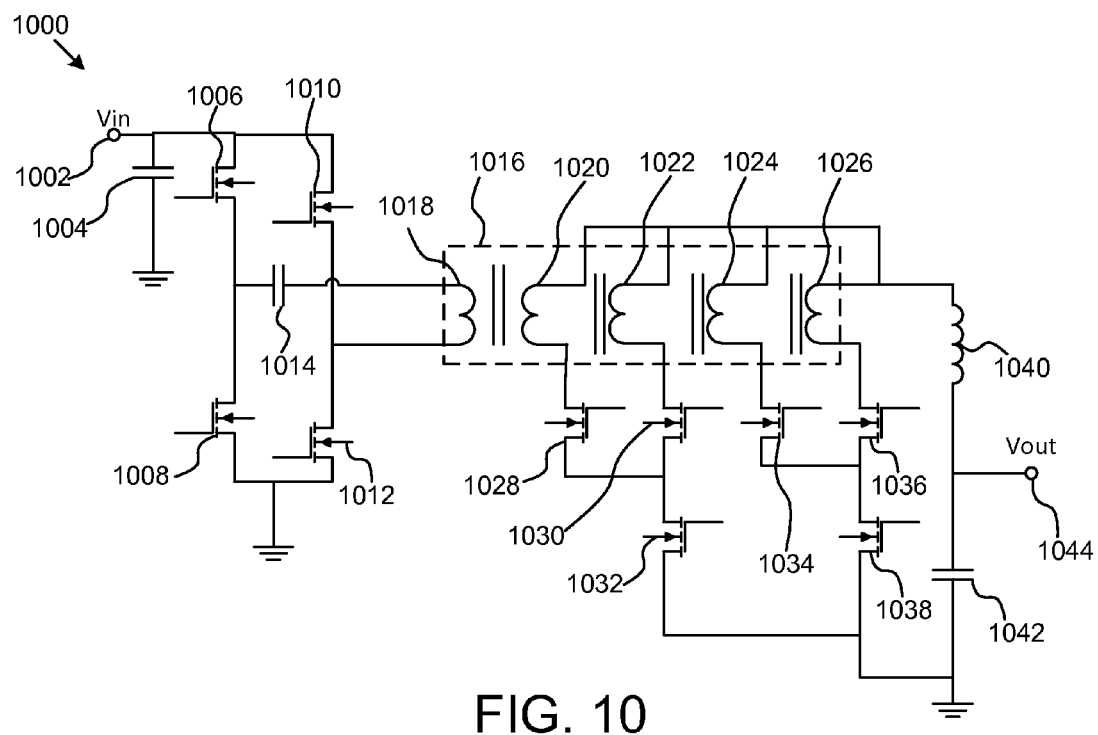
FIG. 10 is a schematic circuit diagram illustrating one embodiment of an apparatus for extending power supply hold-up time by controlling a transformer turn ratio.

FIG. 10 is a schematic circuit diagram illustrating one embodiment of an apparatus 1000 for extending power supply hold-up time by controlling a transformer turn ratio. In one embodiment the apparatus 1000 may be referred to as a secondary side MOSFET for full/half bridge topology. In an embodiment apparatus 1000 includes a voltage input terminal 1002, an input capacitor 1004, as well as multiple input transistors 1006, 1008, 1010, and 1012. Input transistors 1006 and 1008 are connected to primary transformer winding 1018 via capacitor 1014. Input transistors 1010 and 1012 are connected directly to primary transformer winding 1018. In the depicted embodiment the output side of transformer 1016 includes a first secondary transformer winding 1020, a second secondary transformer winding 1022, a third secondary transformer winding 1024, and a fourth secondary transformer winding 1026. The first secondary transformer winding 1020 is connected to first control transistor 1032 via transistor 1028. The second secondary transformer winding 1022 is connected to the first control transistor 1032 via transistor 1030. In an embodiment the first control transistor 1032 may thereby turn on both the first secondary transformer winding 1020 and the second secondary transformer winding in response to the input voltage being above the threshold voltage.

As depicted, the third secondary transformer winding 1024 is connected to a second control transistor 1038 via transistor 1034. The fourth secondary transformer winding 1026 is connected to the second control transistor 1038 via transistor 1036. The second control transistor 1038 may thereby turn on both the third secondary transformer winding 1024 and the fourth secondary transformer winding 1026 in response to the input voltage being below the threshold voltage. In one embodiment the output side of apparatus 1000 also includes inductor 1040 and capacitor 1042, which are both connected to voltage output terminal 1044. Apparatus 1000 is thus an example of an embodiment utilizing multiple separate sub-windings that may be selectively controlled without diodes (i.e., with MOSFETs only) to dynamically adjust the turn ratio of transformer 1016.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of extending power supply hold-up time by controlling a transformer turn ratio, comprising:
    receiving, with an input capacitor, an input voltage of a transformer unit;
    switching, with a first control transistor, a first transformer winding to an on state in response to the input voltage being above a voltage threshold level;
    switching, with the first control transistor, the first transformer winding to an off state in response to the input voltage being below the voltage threshold level; and
    switching, with a second control transistor, a second transformer winding to an on state in response to the input voltage being below the voltage threshold level, wherein the first transformer winding and the second transformer winding comprise separate windings located on a same side of a magnetic core of the transformer unit.

2. The method of claim 1, wherein the same side of the magnetic core comprises an input side of the transformer unit.

3. The method of claim 1, wherein the same side of the magnetic core comprises an output side of the transformer unit.

4. The method of claim 1, wherein the first transformer winding comprises thirteen (13) turns and the second transformer winding comprises ten (10) turns.

5. The method of claim 1, wherein the voltage threshold level comprises three hundred and thirty (330) Volts.

6. The method of claim 1, wherein:
    the first transformer winding further comprises a plurality of separate windings; and
    the second transformer winding further comprises a plurality of separate windings.

7. The method of claim 1, wherein the transformer unit further comprises a power supply unit.

8. A system for extending power supply hold-up time by controlling a transformer turn ratio, comprising:
    an input capacitor configured to receive an input voltage of a transformer unit;
    a first control transistor configured to:
        switch a first transformer winding to an on state in response to the input voltage being above a voltage threshold level; and
        switch the first transformer winding to an off state in response to the input voltage being below the voltage threshold level; and
    a second control transistor configured to switch a second transformer winding to an on state in response to the input voltage being below the voltage threshold level, wherein the first transformer winding and the second transformer winding comprise separate windings located on a same side of a magnetic core of the transformer unit.

9. The system of claim 8, wherein the same side of the magnetic core comprises an input side of the transformer unit.

10. The system of claim 8, wherein the same side of the magnetic core comprises an output side of the transformer unit.

11. The system of claim 8, wherein the first transformer winding comprises thirteen (13) turns and the second transformer winding comprises ten (10) turns.

12. The system of claim 8, wherein the voltage threshold level comprises three hundred and thirty (330) Volts.

13. The system of claim 8, wherein:
    the first transformer winding further comprises a plurality of separate windings; and
    the second transformer winding further comprises a plurality of separate windings.

14. The system of claim 8, wherein the transformer unit further comprises a power supply unit.

15. An apparatus for extending power supply hold-up time by controlling a transformer turn ratio, comprising:
- an input capacitor configured to receive an input voltage of a transformer unit;
- a first control transistor configured to:
  - switch a first transformer winding to an on state in response to the input voltage being above a voltage threshold level; and
  - switch the first transformer winding to an off state in response to the input voltage being below the voltage threshold level; and
- a second control transistor configured to switch a second transformer winding to an on state in response to the input voltage being below the voltage threshold level, wherein the first transformer winding and the second transformer winding comprise separate windings located on a same side of a magnetic core of the transformer unit.

16. The apparatus of claim 15, wherein the same side of the magnetic core comprises an input side of the transformer unit.

17. The apparatus of claim 15, wherein the same side of the magnetic core comprises an output side of the transformer unit.

18. The apparatus of claim 15, wherein the first transformer winding comprises thirteen (13) turns and the second transformer winding comprises ten (10) turns.

19. The apparatus of claim 15, wherein the voltage threshold level comprises three hundred and thirty (330) Volts.

20. The apparatus of claim 15, wherein:
- the first transformer winding further comprises a plurality of separate windings; and
- the second transformer winding further comprises a plurality of separate windings.

* * * * *